US007300351B2

(12) United States Patent
Thomas

(10) Patent No.: US 7,300,351 B2
(45) Date of Patent: Nov. 27, 2007

(54) GAMING MACHINE HAVING A PLAYER TIME-SELECTABLE BONUS AWARD SCHEME

(75) Inventor: Alfred Thomas, Las Vegas, NV (US)

(73) Assignee: WMS Gaming Inc., Waukegan, IL (US)

( * ) Notice: Subject to any disclaimer, the term of this patent is extended or adjusted under 35 U.S.C. 154(b) by 891 days.

(21) Appl. No.: 10/611,626

(22) Filed: Jun. 30, 2003

(65) Prior Publication Data

US 2004/0266516 A1 Dec. 30, 2004

(51) Int. Cl.
*A63F 9/24* (2006.01)
*A63F 13/00* (2006.01)

(52) U.S. Cl. ............................ 463/20; 463/19; 463/22

(58) Field of Classification Search .................... None
See application file for complete search history.

(56) References Cited

U.S. PATENT DOCUMENTS

| | | | | |
|---|---|---|---|---|
| 5,273,281 | A | 12/1993 | Lovell | |
| 5,342,047 | A | 8/1994 | Heidel et al. | 273/85 CP |
| 5,393,057 | A | 2/1995 | Marnell | |
| 5,472,196 | A | 12/1995 | Rusnak | |
| 5,720,662 | A | 2/1998 | Holmes, Jr. et al. | 463/20 |
| 6,004,207 | A | 12/1999 | Wilson, Jr. et al. | 463/20 |
| 6,027,115 | A | 2/2000 | Griswold et al. | 273/143 R |
| 6,056,642 | A | 5/2000 | Bennett | 463/20 |
| 6,102,394 | A | 8/2000 | Wurz et al. | 273/138.2 |
| 6,117,010 | A | 9/2000 | Canterbury et al. | 463/20 |
| 6,159,098 | A | 12/2000 | Slominay et al. | 463/25 |
| 6,174,233 | B1 * | 1/2001 | Sunaga et al. | 463/20 |
| 6,190,254 | B1 | 2/2001 | Bennett | 463/13 |
| 6,203,430 | B1 * | 3/2001 | Walker et al. | 463/20 |
| 6,210,275 | B1 | 4/2001 | Olsen | 463/16 |
| 6,251,013 | B1 | 6/2001 | Bennett | 463/13 |
| 6,261,178 | B1 | 7/2001 | Bennett | 463/20 |
| 6,270,409 | B1 | 8/2001 | Shuster | 463/20 |
| 6,270,410 | B1 * | 8/2001 | DeMar et al. | 463/20 |
| 6,270,411 | B1 | 8/2001 | Gura et al. | 463/20 |
| 6,328,649 | B1 * | 12/2001 | Randall et al. | 463/20 |
| 6,358,149 | B1 | 3/2002 | Schneider et al. | 463/27 |
| 6,390,473 | B1 | 5/2002 | Vancura et al. | 273/292 |
| 6,454,649 | B1 | 9/2002 | Mattice et al. | 463/17 |

(Continued)

FOREIGN PATENT DOCUMENTS

EP 0 933 735 A2 8/1999

(Continued)

*Primary Examiner*—Robert Pezzuto
*Assistant Examiner*—Sunit Pandya
(74) *Attorney, Agent, or Firm*—Nixon Peabody

(57) ABSTRACT

The present invention is a gaming machine having a player time-selectable bonus award scheme whereby the player may redeem, at a time of the player's choosing winning outcomes accrued during base game play. Redemption of each of the accrued winning outcomes is accomplished when a player selects an option to display a winning symbol combination associated with the winning outcome. Selection of the option to display the winning symbol combination associated with the winning outcome always yields an award and sometimes yields another winning outcome, again redeemable at a time of the player's choosing. A counter display on the gaming machine increments a number as each winning outcome is accrued, and decrements the number as each winning outcome is redeemed.

30 Claims, 12 Drawing Sheets

U.S. PATENT DOCUMENTS

| | | | | |
|---|---|---|---|---|
| 6,491,584 | B2 | 12/2002 | Graham et al. | 463/25 |
| 6,517,433 | B2 | 2/2003 | Loose et al. | 463/20 |
| 6,547,663 | B1 | 4/2003 | Delott et al. | 463/25 |
| 6,561,904 | B2 | 5/2003 | Locke et al. | 463/25 |
| 6,773,345 | B2 * | 8/2004 | Walker et al. | 463/17 |
| 6,984,174 | B2 * | 1/2006 | Cannon et al. | 463/25 |
| 7,001,273 | B2 * | 2/2006 | Baerlocher | 463/20 |
| 2002/0036381 | A1 | 3/2002 | Scibetta | 273/292 |
| 2002/0151345 | A1 | 10/2002 | Byrne | 463/18 |
| 2002/0151346 | A1 | 10/2002 | Devaull | 463/20 |
| 2003/0054878 | A1 | 3/2003 | Benoy et al. | 463/29 |
| 2003/0069056 | A1 | 4/2003 | Cormack et al. | 463/16 |
| 2003/0087688 | A1 | 5/2003 | Kato | 463/20 |
| 2003/0100360 | A1 | 5/2003 | Manfreidi et al. | 463/25 |
| 2003/0119581 | A1 | 6/2003 | Cannon et al. | |
| 2004/0038725 | A1 | 2/2004 | Kaminkow | 463/20 |
| 2004/0062025 | A1 | 4/2004 | Satoh et al. | 362/27 |

FOREIGN PATENT DOCUMENTS

| | | | |
|---|---|---|---|
| EP | 0 933 735 | A3 | 10/2003 |
| GB | 2 072 395 | A | 9/1981 |
| GB | 2 092 797 | A | 8/1982 |
| GB | 2 098 779 | A | 11/1982 |
| GB | 2 099 198 | A | 12/1982 |
| GB | 2 100 492 | A | 12/1982 |
| WO | WO 97/27568 | | 7/1997 |
| WO | WO 01/82245 | | 11/2001 |

* cited by examiner

60

GAMING MACHINE HAVING A PLAYER TIME-SELECTABLE BONUS AWARD SCHEME

FIELD OF THE DISCLOSURE

This invention is directed to gaming machines, and more particularly, to a gaming machine having a player time-selectable bonus award.

BACKGROUND

Gaming machines providing wagering base games such as electronically driven video slots, video poker, video blackjack, video keno, video bingo, video pachinko, video lottery, and mechanically driven spinning reel slots, etc., are well known in the gaming industry. Generally gaming machines are configured to operate as "stand-alone" units (that may or may not be coupled to a backroom computer) where the outcome of game play is "locally determined", or as part of a server-based gaming network where the outcome of game play may be either locally determined or "centrally determined". For example, a gaming machine located in a bar, a convenience store, a riverboat, or an airplane, may operate as a stand-alone unit, while a gaming machine located in a traditional casino may operate as part of a server-based gaming network within the casino.

Mechanical spinning reel slot machines have maintained their popularity evolving from gaming machines which employ electromechanical control to the more modern day gaming machines which employ micro-processor control. In a modem mechanical spinning reel slot machine, mechanical spinning reels are used to display combinations of reel symbols, which in conjunction with pay line selections, visually notify a game player if he/she has won or lost the slot base game played entirely in controller or computer memory according to rules and math models embedded in a computer program. A modem gaming machine providing video base wagering games (e.g., video poker, video blackjack, video keno, video bingo, video pachinko, video lottery, and the like) is similar to the mechanical spinning reel slot machine in terms of its embedded computer program and operation, however, simulated video images of reels, pay lines, cards, number, etc. are provided by a video display. The video display may be implemented via any type of suitable display, for example, it may be a cathode ray tube (CRT), a liquid crystal display (LCD), or a plasma display.

Recently, secondary or bonus games have been used in conjunction with base games to increase or enhance player enjoyment and therefore encourage game play on the modem gaming machines. Bonus games, however, are triggered by various events during base game play and once the bonus game is triggered, base game play stops and the bonus game begins. The player cannot "store" bonus games for later game play and therefore has little control over when the bonus game is played.

A bonus game may require a player to play a version of the base wagering game or to play a different wagering game offered by the gaming machine. The player of the bonus game may or may not be awarded additional credits. For example, a mechanical spinning reel slot machine can be configured with a bonus game awarding free spins to a player and may therefore be played like the base game. The free spin however, may result in a non-winning symbol combination and therefore the player is not awarded additional credits. In addition, a complex bonus game that differs from its associated base game may require that the player quickly learn new game skills to play the bonus game, thereby changing the rhythm of game play for the player.

SUMMARY OF THE INVENTION

The present invention provides a gaming machine having a player time-selectable bonus award scheme whereby a player redeems, at a time of the player's choosing winning outcomes accrued during base game play. Redemption of each accrued winning outcome is accomplished when a player selects an option to display a winning symbol combination associated with the winning outcome. Selection of the option to display the winning symbol combination associated with the winning outcome always yields an award (i.e., a value payout to the player) and sometimes yields another winning outcome, also redeemable at a time of the player's choosing. A counter display on the gaming machine informs the player of the number of available accrued winning outcomes. The counter display increments a number each time a winning outcome is accrued and decrements the number as each winning outcome is redeemed.

A winning outcome may accrue in response to an occurrence of a pre-selected symbol or a symbol combination during base game play. A winning outcome may also accrue pseudo-randomly as a result of a pseudo random output generator device (e.g., a random number generator (RNG), pooled tickets, etc.) that generates game play outcomes corresponding to a predetermined probability of occurrences of non-winning and winning symbol combinations, or may accrue based on predetermined criterion such as player identity, promotional events, the number of base games played, a dollar amount or credit amount played or won by the player, player tracking card data, the time of day, day of week, etc.

The winning symbol combination revealed upon redemption of a winning outcome is preferably selected from among all possible base game winning symbol combinations displayed in a pay table. In addition, redemption of the winning outcome is preferably accomplished by the player using familiar base game play skills rather than different game play skills. Thus, the player experiences a win each time a winning outcome is redeemed and the player does not have to quickly learn new game skills to redeem the winning outcome.

Redemption of the winning outcomes may occur in a variety of ways depending on the gaming machine configuration and the player's preferences. In one embodiment, the gaming machine having a player time-selectable bonus award scheme is configured with a bonus button having a counter display or meter that increments a number each time a winning outcome is accrued and decrements the number each time a player chooses to redeem one of the accrued winning outcomes. When one winning outcome is redeemed, an award associated with a revealed winning symbol combination is credited to the player.

In another embodiment of the invention, the gaming machine having a player time-selectable bonus award scheme is configured with multiplier bonus button having a counter display or meter that increments a multiplier number each time a winning outcome is accrued and decrements to zero each time the player selects the multiplier bonus button to redeem all accrued winning outcome(s) at one time. The counter display increments by a predetermined multiplier number that can vary depending on the game implementation. Each time a winning outcome is accrued, an associated multiplier number is added to previous multiplier numbers on the counter display to form a total multiplier number.

When redeemed, an award associated with one revealed winning symbol combination is multiplied by the total multiplier number reflected on the counter display, and the resulting multiplied award, or "mega-award", is credited to the player. Thus, all winning outcomes previously accrued are redeemed at one time, resulting in one winning symbol combination yielding a mega-award, and the counter display resets to zero.

In yet another embodiment of the invention, the gaming machine having a player time-selectable bonus award scheme is configured with (1) a counter display that increments a number each time a winning outcome is accrued and decrements the number each time a player chooses to redeem the accrued winning outcome, (2) a bonus button that enables the player to redeem one winning outcome at a time, and (3) a multiplier bonus button that enables the player to redeem all winning outcomes at one time via displaying one winning symbol combination with an award that is multiplied by a number equivalent to all of the accrued winning outcomes. If the player selects the first button to redeem one winning outcome, the counter display is decremented by one number. If the player selects the second button to redeem all winning outcomes at one time, the counter display is reset to zero (unless redemption results in another winning outcome). In addition, an award associated with one revealed winning symbol combination is multiplied by the total multiplier number reflected on the counter display, and the resulting multiplied award, or "mega-award", is credited to the player.

In a further embodiment of the invention, the gaming machine having a player time-selectable bonus award scheme is configured with (1) a counter display that increments by a number each time a winning outcome is accrued and decrements by a number equivalent to a number of winning outcomes the player chooses to redeem at one time, (2) a variable bonus button that enables the player to redeem one or more winning outcomes at one time via displaying one winning symbol combination with an associated award that is multiplied by a number equivalent to the number of winning outcomes that the player redeems at the one time. Thus, when the player selects the first button to redeem two winning outcomes at one time, the counter display decrements by two, and the award associated with the resulting winning symbol combination is multiplied by two.

Additional aspects of the invention will be apparent to those of ordinary skill in the art in view of the detailed description of various embodiments, which is made with reference to the drawings, a brief description of which is provided below.

DESCRIPTION OF THE PREFERRED EXAMPLES

Figure 1:
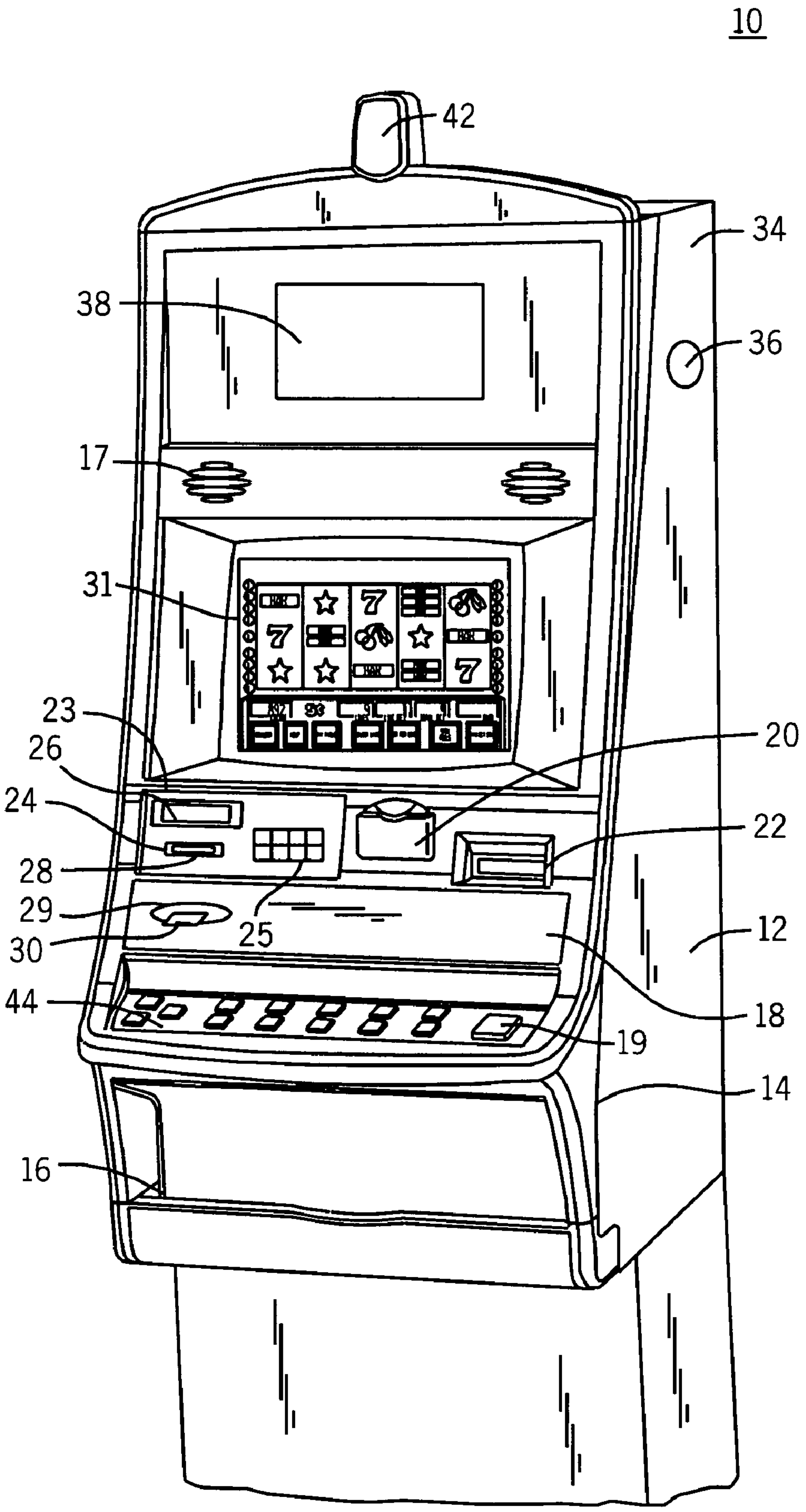
FIG. 1 is a perspective view of an embodiment of a gaming machine offering a player time-selectable bonus award scheme.

The description of the preferred examples is to be construed as exemplary only and does not describe every possible embodiment of the invention. Numerous alternative embodiments could be implemented, using either current technology or technology developed after the filing date of this patent, which would still fall within the scope of the claims defining the invention.

In general, the present invention provides a gaming machine having a player time-selectable bonus award scheme wherein a player accrues winning outcomes during base game play and then redeems the winning outcomes at a time of the player's choosing. A counter display on the gaming machine increments each time a winning outcome is accrued during base game play. The winning symbol combination and therefore the award associated with the winning outcome, however, are not revealed until the winning outcome is redeemed by the player. The counter display decrements each time the winning outcome is redeemed by the player.

The gaming machine having a player time-selectable bonus award scheme in accordance with the invention represents a "paradigm shift" in receiving a win during wagering game play. Under the old paradigm provided by prior art game play, a win (e.g., a winning reel symbol combination, a winning poker hand) is revealed immediately upon completion of a base game (e.g., a reel spin). Under the new paradigm provided by the gaming machine having a player time-selectable bonus award scheme, a winning outcome representing a yet-to-be revealed win can be held for later use, thereby allowing the player to control the rhythm and emotion of game play. Having an effect much like the thrill and anticipation associated with unwrapping a gift, the gaming machine having a player time-selectable bonus award scheme allows the player to reveal the winning symbol combinations associated with accrued winning outcomes at a time the player feels that he/she needs them the most.

For example, under the old paradigm, a player who is having an extended period of consecutive loses (dry spell) on a particular gaming machine may get discouraged and choose to play the game until a certain amount of credits are left and then cash-out; a negative game play experience. Under the new paradigm provided by the gaming machine having a player time-selectable bonus award scheme, a player with accrued winning outcomes having a dry spell may choose to use all available credits on the credit meter with the knowledge that he/she can redeem accrued winning outcomes after all available credits are used, thereby extending game play. Moreover, upon redemption of the winning outcomes, the player may feel as though he/she is playing with "house money" rather than his/her own money. Thus, the guaranteed wins resulting from redemption of the winning outcomes are used by the player to ensure a positive gaming experience.

As described below, the present invention is suitable for implementation in a mechanical spinning reel slot machine. It is contemplated that the present invention is also suitable for implementation in a video slot machine or in other types of video gaming machines. Winning outcomes may therefore be accrued during play of a slot game, a bingo game, a keno game, a blackjack game, or any other wagering game played on a gaming machine.

An advantageous feature of the gaming machine having a player time-selectable bonus award scheme is that redemption of a winning outcome by a player always yields a winning symbol combination and therefore an award or value payout to the player. Thus, in the context of a bonus game scheme, accrual of a winning outcome may be referred to as a "can't lose" bonus award. Redemption of a winning outcome preferably results in a winning symbol combination that is identical to a winning symbol combination displayed on a base game pay table of the gaming machine. In another embodiment of the invention, redemption of a winning outcome results in a winning symbol combination displayed on another, non-base game pay table. In both cases, the winning symbol combination is not revealed until the player chooses to redeem the winning outcome.

The math (e.g., probabilities, expected values, pays, etc) used for both base game play and redemption of the winning outcomes combine to yield a positive overall hold percentage thereby yielding a profit for the gaming proprietor. An occurrence of a particular winning symbol combination displayed in response to redemption of a winning outcome is preferably substantially identical to the occurrence of the particular winning symbol combination during play of the base game where all non-winning symbol combinations are excluded. In addition, the odds of getting a particular winning symbol combination can be decreased or increased in the player's favor during redemption of a winning outcome, and vice versa. In other words, as long as redemption of a winning outcome yields a winning symbol combination (and therefore a win), the odds of getting a particular winning symbol combination upon redemption of the winning outcome can be the same or be varied from odds of getting the particular winning symbol combination during base game play.

FIG. 1 is a perspective view of one possible embodiment of a gaming machine 10 offering a player time-selectable bonus award. The gaming machine 10 may be any type of wagering gaming machine offering a player time-selectable bonus award and may therefore have varying structures and methods of operation. For example, the gaming machine 10 may be a mechanical spinning reel gaming machine (with or without and arm mechanism) configured to play a slot game, or it may be a video gaming machine configured to play a video wagering game, any number of class II or class III games defined by the Indian Gaming Regulatory Act (IRGA), and so on. For exemplary purposes, various elements of the gaming machine 10 are described below, but it should be understood that numerous other elements may exist and may be utilized in any number of combinations to create a variety of gaming machine types.

Referring to FIG. 1, the gaming machine 10 includes a cabinet 12 having a door 14 to provide access to the interior of the gaming machine 10. Attached to the door 14 are audio speaker(s) 17 and a belly glass area 18 that typically displays game theme artwork. The audio speaker(s) 17 may be used to generate a variety of sounds such as the sound of spinning slot machine reels, a dealer's voice, music, announcements or any other audio related to the wagering game.

Also attached to the door 14 are a number of value input devices that allow a player to insert value for game play. The value input devices may include a coin slot acceptor 20 or a note acceptor 22 to input value to the gaming machine 10. The note acceptor 22 may accept value in any number of forms, including currency or a currency-sized paper ticket voucher inscribed with information such as a bar code representing value, the name of the casino, the date, etc. As used herein, the term "value" may encompass gaming tokens, coins, paper currency, ticket vouchers, credit or debit cards, smart cards, and any other object representative of value.

The gaming machine 10 may also include a player tracking area 23 having a card reader 24, a keypad 25 and a display 26. As will be appreciated by those of ordinary skill in the art, the player tracking area 23 may be located in any number of areas of the gaming machine 10. The display 26 may be implemented using a vacuum fluorescent display (VFD), a liquid crystal display (LCD), an LED display, and/or a touch screen to display information to a game player or casino employee. The card reader 24 may include any type of card reading device, such as a magnetic card reader, smart card reader or an optical card reader. The card reader 24 may be used to read data from a card (e.g., a credit card, a player tracking card, a smart card, etc.) offered by a player. If provided for player tracking purposes, the card reader 24 may be used to read data from, and/or write data to, cards capable of storing data. Such data may include the identity of a player, the identity of a casino, the player's gaming habits, etc. Once gathered, the data can be "mined" (i.e., the data is sorted to identify patterns and establish relationships) for any number of purposes including administering player awards, distinguishing player preferences and habits, accounting, etc.

The gaming machine 10 also includes a main display device 31 for displaying video game images (e.g., simulated reel symbols, simulated cards, simulated numbers, etc.), or in the case of a mechanical spinning reel slot machine, for displaying a symbol array of artwork and blank symbols affixed to mechanical spinning reels viewable to the player. The symbol array may include occurrences of non-winning symbol combinations where no value payout is awarded to the player, or occurrences of winning symbol combinations (reflected in a pay table) where value payouts are awarded to the player. In addition, the main display device 31 may display animation, 2-D or 3-D images and digital video playback.

For video gaming machines, the main display device 31 may be implemented as a CRT, an LCD, a plasma display, or other type of video display suitable for use in a gaming machine, and may be configured with or without a touch screen. For example, in a video gaming machine offering a card game such as poker, the main display device 31 may include an LCD-TFT display displaying one or more cards.

For mechanical spinning reel slot machines, the main display device 31 may include a reel display area adapted to display game information to a player while, at the same time, allowing a player to view the reel symbol array provided by the stopped mechanical spinning reels. The game information displayed to the player may include game denominations, available credits, pay lines, wagering information, and other suitable game information. When the mechanical spinning reels are rotated and stopped, the resulting symbol array in conjunction with game information displayed in the reel display area provide a game outcome and game status to the player.

Figure 2:
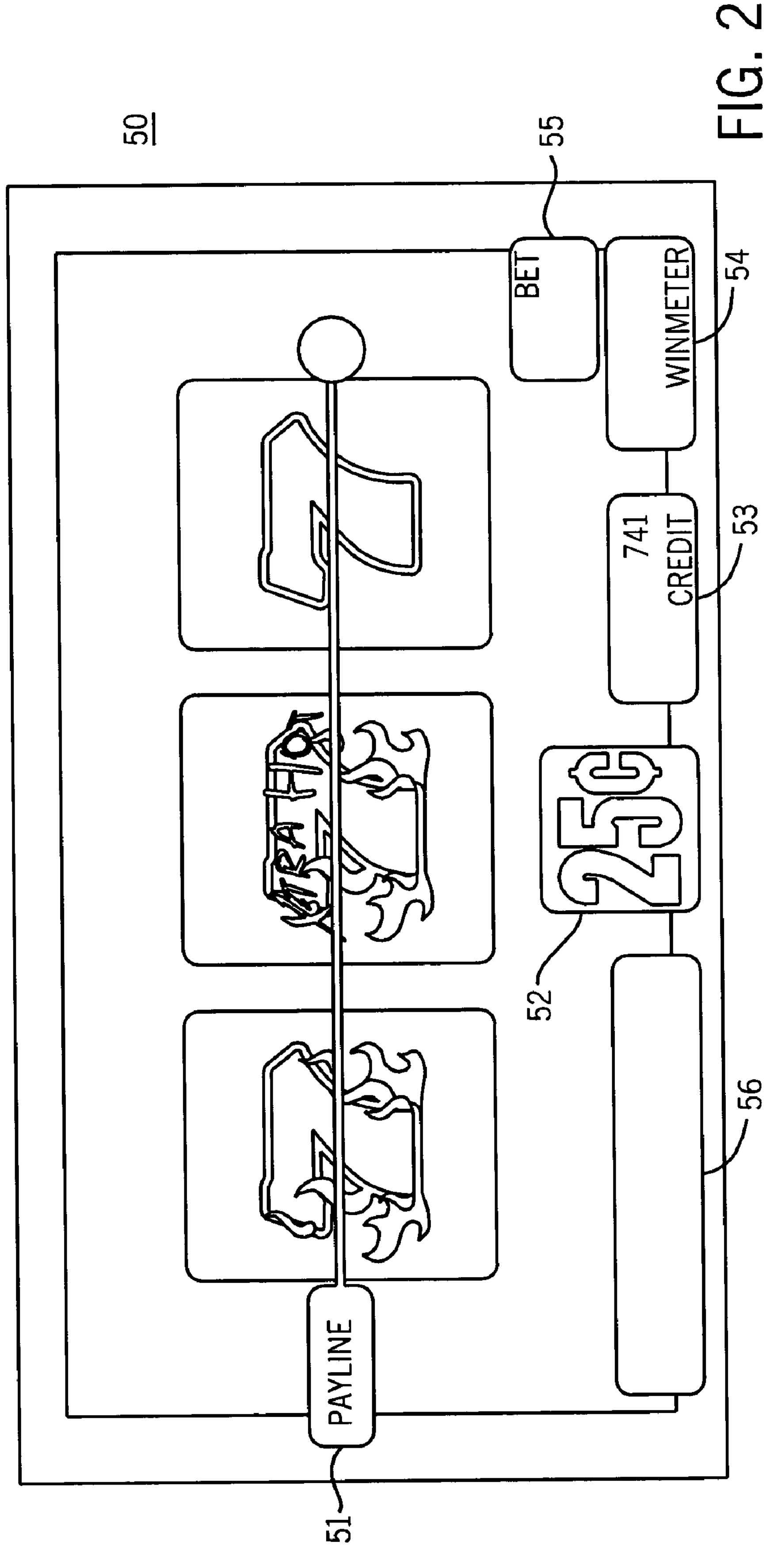
FIG. 2 is an exemplary reel display area of a gaming machine of FIG. 1 offering a player time-selectable bonus award scheme.

For example, FIG. 2 is an exemplary reel display area 50 for a slot game, X-tra Hot 7's™, that may be included in the main display device 31. The exemplary reel display area 50 includes one pay line 51 superimposed across three mechanical spinning reels, a denomination indicator 52 for indicating a value-per-credit (e.g., twenty-five cents per credit), a credit meter 53 for displaying a number of credits available for game play, a win meter 54 for displaying credits resulting from a winning symbol combination, a bet indicator 55 for displaying the number of credits wagered for a particular play, and an additional information display 56. The credit meter 53, the win meter 54, the bet indicator 55, and the additional information display 56 may be enabled via an array of light emitting diodes (LEDs), a cathode ray tube (CRT), an LCD, a plasma display, or any other type of suitable display.

Referring again to FIG. 1, the gaming machine 10 may also include a box top 34 having additional speaker(s) 36 and a top box display device 38. Although not separately illustrated, the top box may include a camera and/or a microphone, and/or physical objects such as mechanical reels, wheels, or dice. The top box display device 38, if configured as a dynamic display mechanism, may enable a number of game enhancements such as bonus games, interactive tournament games, progressive jackpot games, etc.

Figure 3:
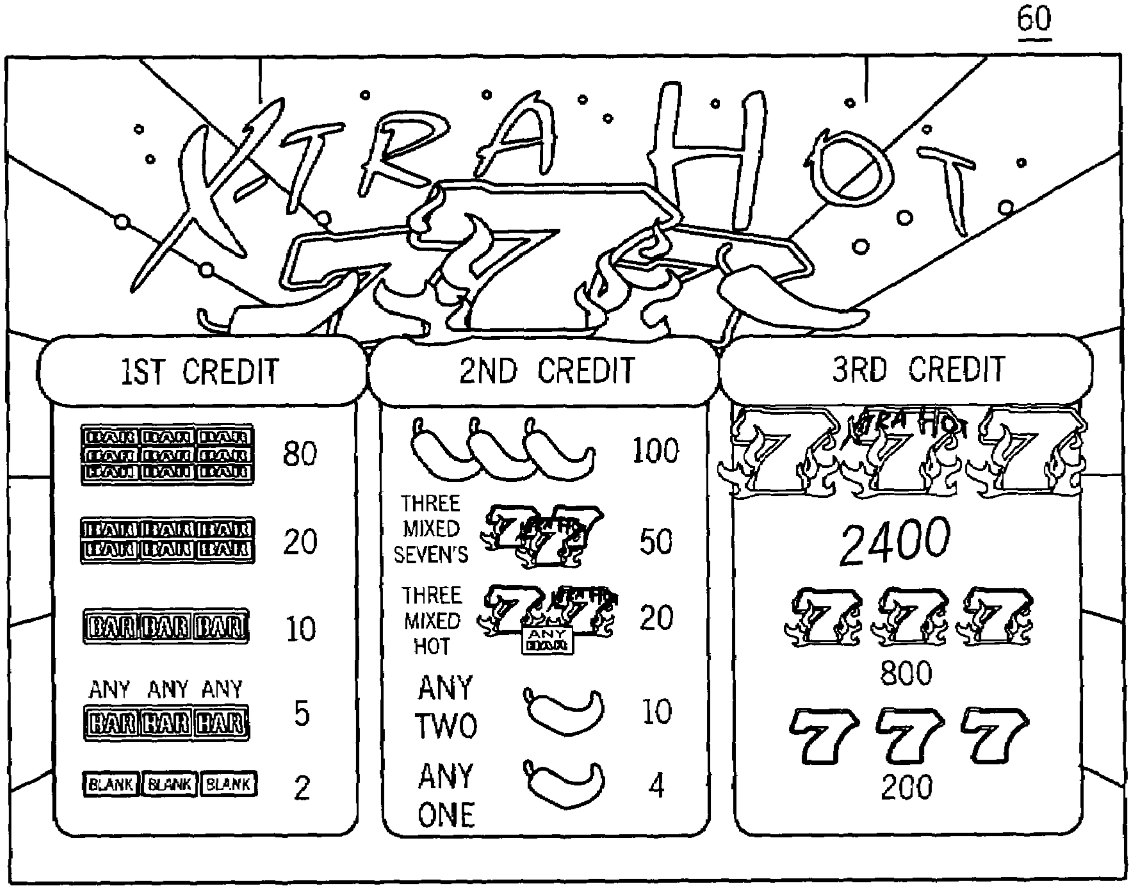
FIG. 3 is an exemplary pay table display of a gaming machine of FIG. 1 offering a player time-selectable bonus award scheme.

In the case of a mechanical spinning reel slot machine, the top box display device 38 may be a static display configured to display award information such as pay tables for base or bonus games via glass art. For example, FIG. 3 is exemplary pay table 60 for the X-tra Hot 7's™ slot game. In the illustrated example, the pay table 60, including winning symbol combinations and their associated awards, is displayed via glass art. The winning symbol combinations have payout values ranging from a 2 credit payout to a 2400 credit payout. In addition, the pay table illustrates that the more credits-per-bet played, the higher the number of winning symbol combinations available to the player. For instance, if a player bets 1 credit, five winning symbol combinations are possible (resulting in 2, 5, 10, 20, or a maximum of 80 credits). If the player bets 3 credits, thirteen winning symbol combinations are possible including a 2400 credit win when an occurrence of three X-tra Hot 7 artwork symbols are displayed along the pay line.

The gaming machine 10 may also include a player control panel 44. The player control panel 44 may be provided with a number of pushbuttons or touch-sensitive areas (i.e., touch screen) that may be pressed by a player to select games, make wagers, make gaming decisions, etc. As used herein, the term "button" is intended to encompass any device that allows a player to make an input, such as a mechanical input device that must be depressed to make an input selection or a display area that a player may simply touch. The number of pushbuttons may include one or more "Bet" buttons for wagering, a "Max Bet" button for making the maximum wager allowable for the game, a "Play" button for beginning pay, a "Repeat" button for repeating the previous wagering selection, a "Collect" button for terminating play and cashing out of the game, a "Help" button for viewing a help screen, a "See Pays" button for causing the main display device 31 to generate one or more display screens showing the odds or payout information for the game or games provided by the gaming machine 10, and a "Call Attendant" button for calling an attendant. Further, although the control panel 44 is shown to be separate from the main display device 31, it should be understood that the control panel 44 could be generated by the main display device 31 as a touch-sensitive screen.

If the gaming machine 10 is configured as a spinning reel slot machine, the player control panel 44 may be provided with a number of wager selection buttons that allow a player to specify a wager amount for each pay line selected (via selecting multiple amounts of the smallest wager accepted). In addition, the gaming machine 10 may also include a number of pay line selection buttons that allow the player to select one of a number of possible of pay lines prior to spinning the reels. For example, five selection buttons may be provided to allow a player to select one, three, five, seven or nine pay lines prior to each reel spin.

Bonus Game Button

Figure 4:
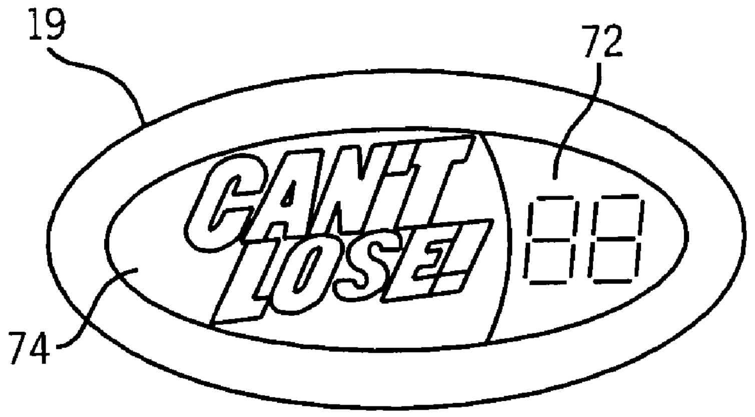
FIG. 4 is a perspective view of an embodiment of a bonus button of a gaming machine of FIG. 1 offering a player time-selectable bonus award scheme.

The gaming machine also includes one or more bonus game button(s) 19 adapted to enable a player who has accumulated winning outcomes to redeem the winning outcome at a time of his selection. In the illustrated example the bonus game button 19 is on the control panel 44 however, the bonus game button 19 may also be located elsewhere on the gaming machine 10, for example, on a touch screen provided by the main display device 31. In addition, the bonus game button 19 may be configured as having one of any number of shapes. For example, FIG. 4 is a perspective view of an embodiment of a bonus game button 19 having an oval shape. In the illustrated example, the bonus game button 19 includes a counter display 72 configured as two, seven-segment LEDs that displays the number of winning outcomes (up to 99) the player has accumulated during base game play. The counter display 72 increments a number when a player accrues the winning outcome and decrements the number when the player redeems the winning outcome. Although shown as a two, seven-segment LED, the counter display 72 may be implemented using other suitable methods. In addition, although shown embedded within the bonus game button 19, it is contemplated that the counter display 72 may be located elsewhere on the gaming machine 10. The bonus game button 19 also includes a feature name 74 (e.g., "Can't Lose") to direct the players attention to the counter display 72 and to enable redemption of a winning outcome (s). The bonus game button 19 may additionally include luminescent or other special lighting effects to increase visibility to the player.

Figure 5:
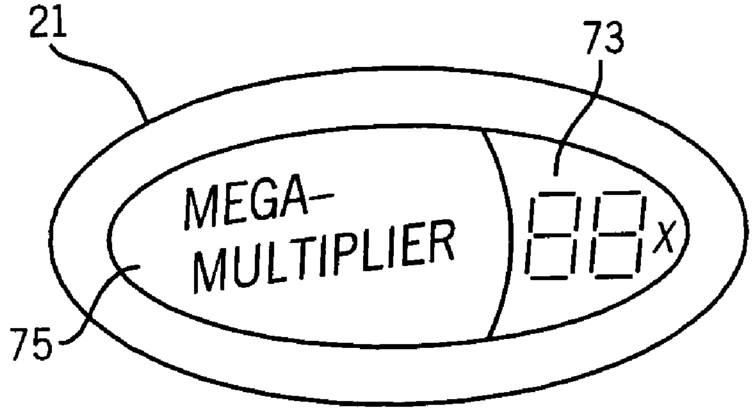
FIG. 5 is a perspective view of an embodiment of a multiplier bonus button of the gaming machine of FIG. 1 offering a player time-selectable bonus award scheme.

FIG. 5 is perspective view of an embodiment of a multiplier bonus button 21 having an oval shape. Like the bonus button described above, the multiplier bonus button includes a feature name 75 and a counter display 73. During operation, the counter display 73 increments by a predetermined multiplier number that can vary depending on the game implementation. Each time a winning outcome is accrued, an associated multiplier number is added to previous multiplier numbers on the counter display 73 to form a total multiplier number. When the multiplier bonus button 21 is selected by the player (indicating player desire to redeem an accrued winning outcome), an award associated with one revealed winning symbol combination is multiplied by the total multiplier number reflected on the counter display 73 to yield a multiplied, or mega-award. The mega-award is credited to the player and the counter display 73 resets to zero. Although not separately illustrated, a variable bonus game button enabling one or more of the accrued winning outcomes to be redeemed at one time my also be included on the gaming machine 10. Moreover, the bonus button, the multiplier bonus button and the variable bonus button, may be implemented as mechanical buttons or as touch screen buttons and may be included individually or in combination on any type of gaming machines.

Referring again to FIG. 1, when a player inserts value in the gaming machine 10, a number of credits corresponding to the amount deposited are shown on a credit meter for example, on the credit meter 53 (FIG. 2). After depositing the appropriate amount of value and making a pay line(s) selection, the player can begin game play by pulling the mechanical arm or by pushing an appropriate button such as the Bet button, the Max Bet button, or the Play button on the player control panel 44. Additional details describing game play on the gaming machine 10 having a player time-selectable bonus award scheme are included below as described in FIG. 7.

Figure 6:
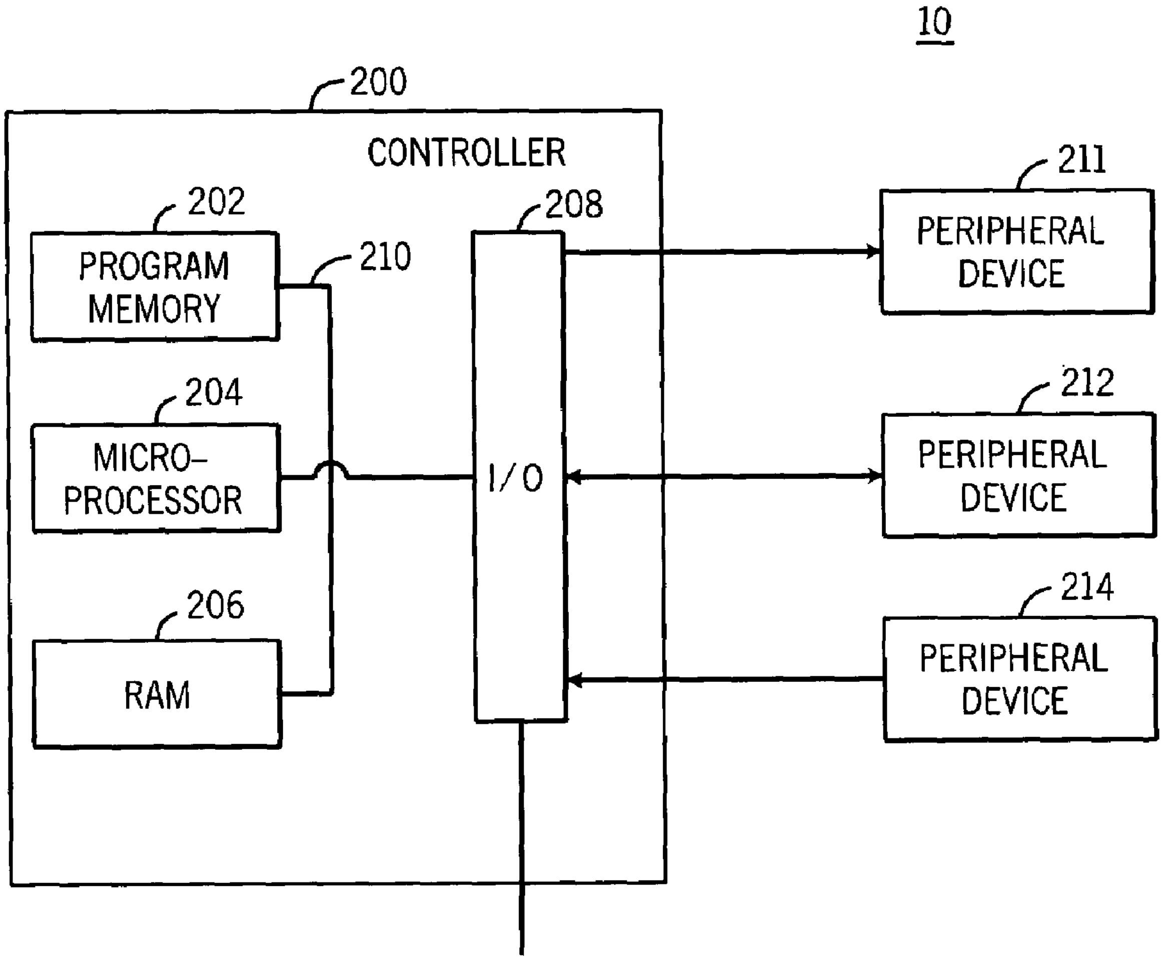
FIG. 6 is a block diagram of the electronic components of the gaming machines of FIG. 1.

FIG. 6 is a block diagram of a number of components that may be incorporated in each of the gaming machine(s) 10 of FIG. 1. Referring to FIG. 6, the gaming machine 10, includes a controller 200 that may comprise a program memory 202 (including a read only memory (ROM)), a microcontroller-based platform or microprocessor (MP) 204, a random-access memory (RAM) 206 and an input/output (I/O) circuit 208, all of which may be interconnected via a communications link, or an address/data bus 210. The microprocessor 204 is capable of displaying images, symbols and other indicia such as characters, people, places, things, and faces of cards. The RAM 206 is capable of storing event data or other data used or generated during a particular game. The program memory 202 is capable of storing program code which controls the gaming machine 10 so that it plays a particular game in accordance with applicable math models, game rules, and pay tables. For example, when a winning outcome is redeemed by a player playing a slot game, the microprocessor 204, executing code in the program memory 202, causes a winning symbol combination to be displayed to the player and causes associated credits to be awarded to the player.

It should be appreciated that although only one microprocessor 204 is shown, the controller 200 may include multiple microprocessors 204. For example, the controller 200 may include one microprocessor for executing low level gaming functions and another processor for executing higher level game functions such as some communications, security, maintenance, etc. Similarly, the memory of the controller 200 may include multiple RAMs 206 and multiple program memories 202, depending on the requirements of the gaming machine 10. Although the I/O circuit 208 is shown as a single block, it should be appreciated that the I/O circuit 208 may include a number of different types of I/O circuits. The RAM(s) 206 and program memory(s) 202 may be implemented as semiconductor memories, magnetically readable memories, and/or optically readable memories, etc. Further, the term "controller" is used herein to refer collectively to the program memory 202, the microprocessor 204, the RAM 206 and the I/O circuit 208.

FIG. 6 illustrates that multiple peripheral devices, depicted as peripheral devices 211, 212, and 214, may be operatively coupled to the I/O circuit 208. The peripheral devices may include a control panel with buttons, a coin slot acceptor, a note acceptor, a bill validator, a card reader, a keypad, a sound circuit driving speakers, a card reader display, a video display, a touch screen, etc. In the case of a spinning reel slot machine, the peripheral devices may include a number of electromechanical spinning reels and a mechanical arm similarly coupled to the I/O circuit 208. Although three peripheral devices are depicted, more or less peripheral devices may be included.

It should be appreciated that although the controller 200 is a preferable implementation of the present invention, the present invention also includes implementation via one or more application specific integrated circuits (ASICs), field programmable gate arrays (FPGA), adaptable computing integrated circuits, one or more hardwired devices, or one or more mechanical devices. Furthermore, although the controller 200 preferably resides in each of the gaming machine 10 the present invention includes providing some or all of its functions at another location such as a server coupled to the gaming machine 10.

One manner in which the gaming machine 10 may operate is described below in connection with one or more flowchart(s) which represents a number of portions or routines of one or more computer programs, which may be stored in one or more of the memories of the controller 200. The computer program(s) or portions thereof may also be stored remotely, outside of the gaming machine 10 and may therefore control the operation from a remote location.

As previously mentioned, typical bonus game award schemes do not allow a player to accrue bonus games for later play. Thus, the player has little control over prior bonus game play and therefore cannot control the rhythm and emotion of game play. In addition, some bonus game award schemes require a player to quickly learn new game skills to play the bonus game. The gaming machine 10 having a player time-selectable bonus award scheme however, is configured to allow a player to choose when to redeem the winning outcomes yielding winning symbol combinations and associated value payouts. In addition, redemption of the winning outcomes preferably requires only that the player select the appropriate bonus button and then use existing game skills (required for base game play) to cause the associated winning symbol combination to be displayed.

Accrual of winning outcomes by a player during base game play may be triggered by a number of events including, but not limited to, pre-selected symbols, pre-selected symbol combinations that may or may not be reflected in the base game pay table display, a player's identity, promotional events, the number of base games played, a dollar amount or credit amount played or won by the player, player tracking card data, the time of day, the day of week, etc. Alternatively, winning outcomes may also accrue due to operation of a pseudo random generator device.

Redemption of the winning outcomes may occur in a variety of ways depending on the gaming machine configuration and the player's preferences. In one embodiment, the gaming machine having a player time-selectable bonus award scheme is configured with a bonus button (e.g., Can't Lose button) having a counter display or meter that increments a number each time a winning outcome is accrued and decrements the number each time a player chooses to redeem one of the accrued winning outcomes. When one winning outcome is redeemed, an award, or value payout associated with a revealed winning symbol combination is credited to the player.

Figure 7:
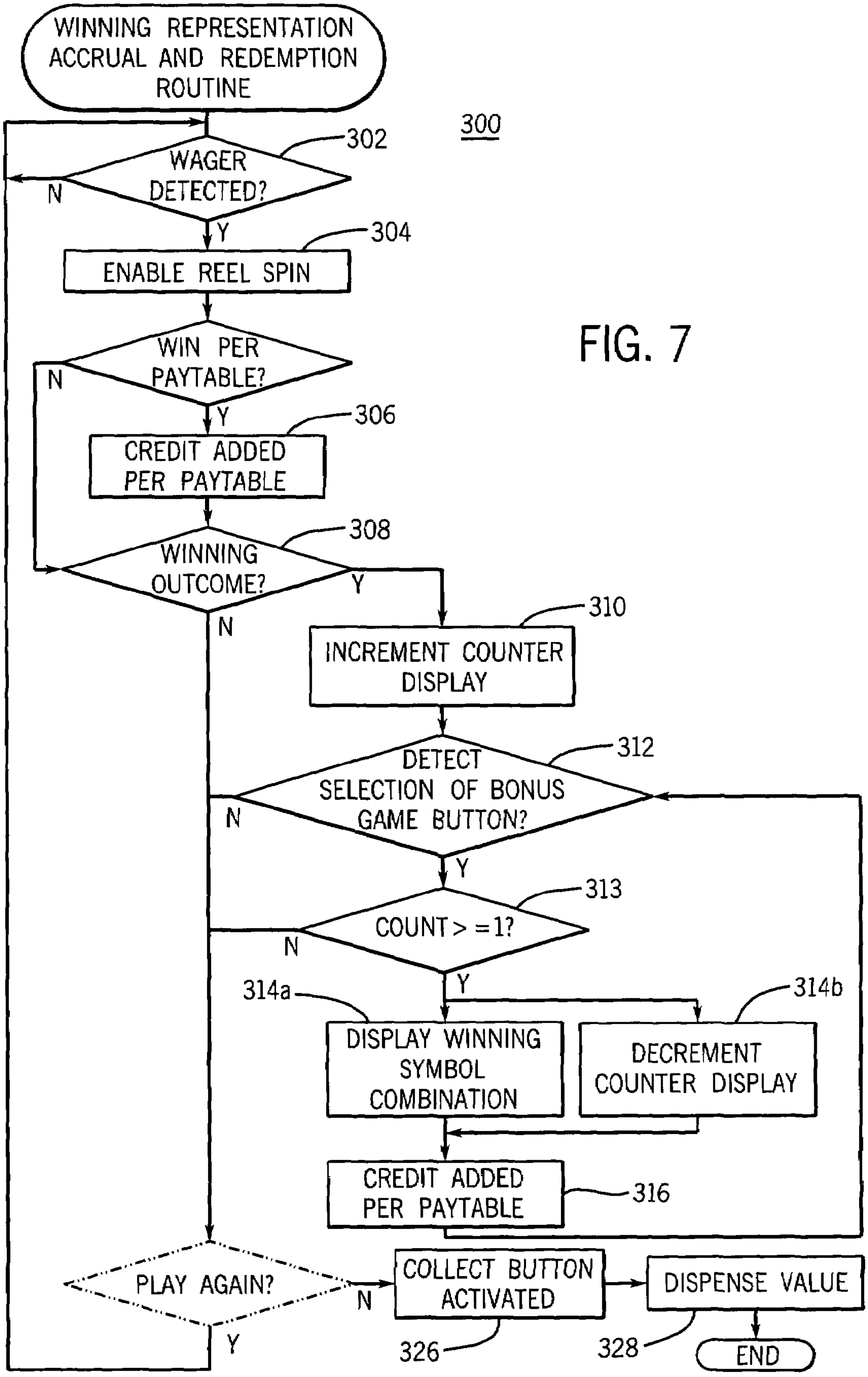
FIG. 7 is a flowchart of a winning outcome accrual and redemption routine that may be performed during operation of the gaming machines of FIG. 1.

FIG. 7 is a flowchart of a winning outcome accrual and redemption routine 300 that may be performed by the controller 200 of the gaming machine. Alternatively, the winning outcome accrual and redemption routine 300 may be performed by another controller coupled to the gaming machine 10. The winning outcome accrual and redemption routine 300 provides one example of a player time-selectable bonus award scheme provided by the gaming machine 10. Although discussed below in the context of a slot game for illustrative purposes, it is contemplated the winning outcome accrual and redemption routine 300 may be executed in conjunction with any number of other wagering games provided by gaming machines.

Referring to FIG. 7, the winning outcome accrual and redemption routine 300 begins operation when the controller 200 detects a wager for base game play (step 302). Detection of a wager includes detecting a value input, detecting a bet, and detecting game play initiation by a player. The controller 200 detects the value input when a player deposits one or more of coins, paper currency, a card, or a voucher into a value input device of the gaming machine 10. When the controller 200 detects the value input, a number of credits corresponding to the amount deposited are displayed on a credit meter of the main display device 31, for example, on the credit meter 53. After value input detection, the controller 200 enables a pay line selection. If there is only one pay line as illustrated in FIG. 2, the controller 200 enables initiation of base game play. If there is more than one pay line, the controller 200 also enables a bet-per-pay line selection. The bet-per-pay line selection causes an amount per pay line to be bet or wagered with the total wager divided equally between each selected pay line if multiple pay lines are selected. The bet-per-pay line is also displayed to the player via a bet meter (e.g., the bet meter 55) on the gaming machine 10. In addition, the controller 200 enables the player to select a maximum bet (via a "Max Bet Spin" button). Thus, the player may chose the maximum bet option causing maximum pay line selection and maximum credits rather than the pay line selection and the bet per pay line selection.

Upon detecting the pay line(s) and bet-per-pay line selections (if applicable) and verifying the value input, the controller 200 enables play of the base game; in the illustrated example, enables reel spin (step 304). The player may spin the reels of a slot game by depressing a button such as a "Spin Reels" pushbutton provided on the player control panel 44 or depressing a video display button provided by a touch screen on the gaming machine 10. Alternatively, if the slot game is a mechanical spinning reel slot game utilizing a number of mechanical spinning reels, the player may pull a handle provided on the gaming machine 10 to initiate the reel spin. In either case, the controller 200, having determined a game outcome based on operation of a pseudo random generator device, stops the reels such that they display a symbol array representing the game outcome.

Upon completion of the base game, if reel symbols on the stopped reels match one of the winning symbol combinations displayed on a pay table, the controller 200 credits (step 306) the player with a value payout associated with the displayed winning symbol combination. The additional value payout is reflected as credits on a credit meter (e.g., the credit meter 53). If reel symbols on the stopped reels do not match one of the winning symbol combinations, indicating a loss, no value payout is credited to the player.

During base game play, a player may accrue a number of winning outcomes as discussed above. Accrual of a winning outcome may result from an occurrence of a particular reel symbol or combination of reel symbols. A winning outcome may also accrue as a result of operation of a pseudo random generator device or may accrue based on a predetermined criterion such as a player's identity, promotional events, a pre-selected number of base games played, a pre-selected dollar amount or credit amount, player tracking card data, a particular time of day, day of the week, etc.

Figure 8:
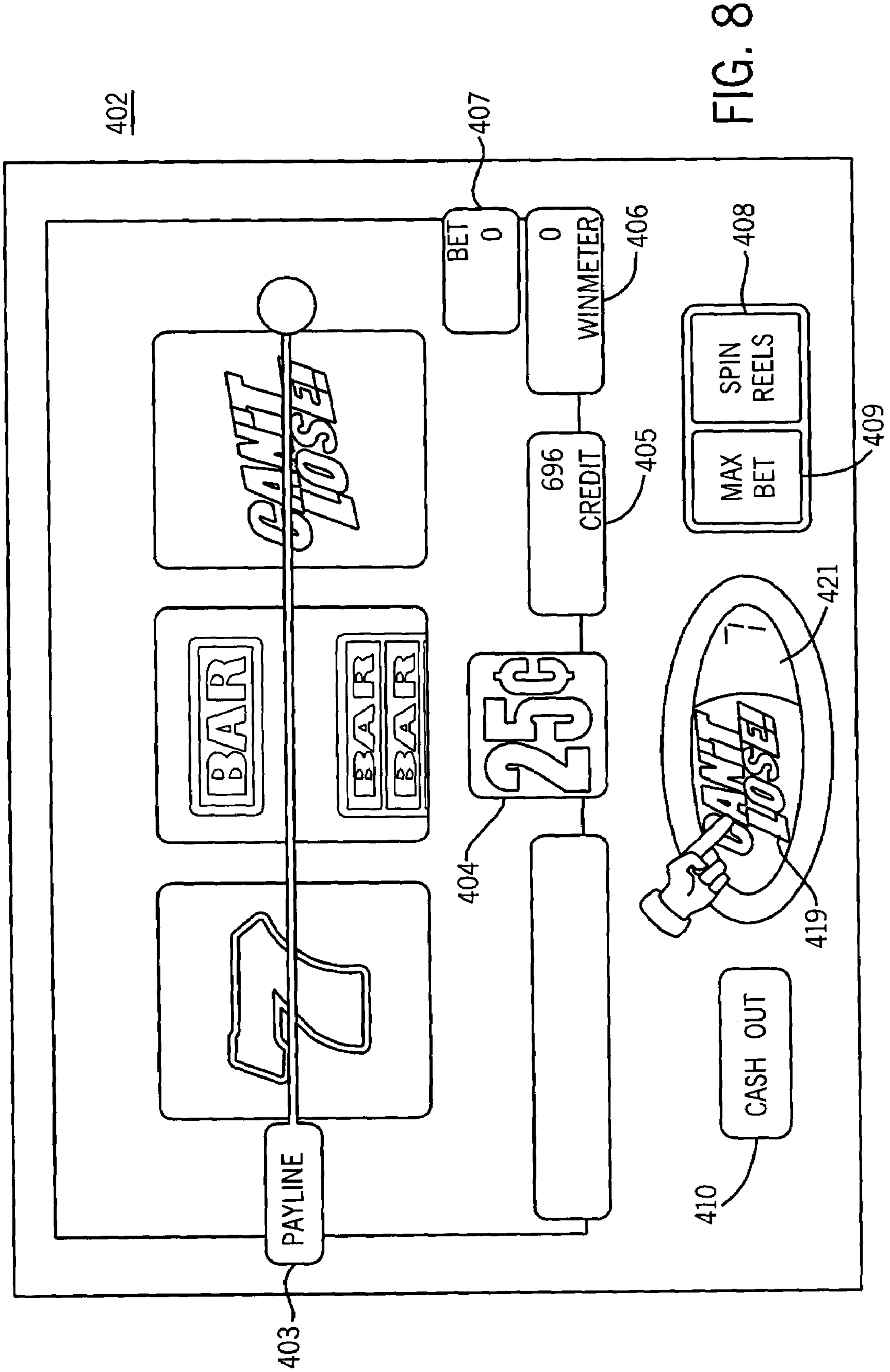
FIGS. 8-13 are a series of exemplary visual reel display areas that may be displayed during performance of the winning outcome accrual and redemption routine of FIG. 7.

As previously mentioned, a counter display on the gaming machine 10 is configured to display the number of winning outcomes the player has accrued. The details of the winning outcome, however, are not revealed until the winning outcome is redeemed by the player. For example, FIG. 8 is an exemplary reel display area 402 that may be displayed on the main display device 31 during performance of the winning outcome accrual and redemption routine 300. In the illustrated example, the exemplary reel display area 402 includes one pay line 403, a denomination indicator 404 for indicating a value-per-credit, a credit meter 405 for displaying a number of credits available for game play, a win meter 406 for displaying credits resulting from a winning symbol combination, a bet indicator 407 for displaying the number of credits wagered for a current game. Also included in the exemplary reel display area 402 are a "Spin Reels" button 408, a "Max Bet" button 409, a "Cash Out" button 410, and the bonus game button 419. As described in connection with FIGS. 4 and 5, the bonus game button 419 includes a counter display 421 and a feature name, (i.e., "Can't Lose") and is adapted to enable a player who has accumulated winning outcomes, to redeem the winning outcomes at a time of his choosing. Alternatively, the counter display 421 may be separately located from the bonus game button 419.

Referring again to FIG. 7 (in conjunction with the exemplary reel display area 402), the controller 200 determines whether the player has won, or accrued a winning outcome (step 308). If the player has not accrued a winning outcome, the controller 200 enables additional base game play if another wager is detected (step 302). If another wager is not detected and the player has not accrued a winning outcome, the controller 200 may detect selection (step 326) of a cash-out option via selection of a cash-out button by the player, for example, via selection of the "Collect" button provided on the gaming machine 10. Upon detecting selection of the cash-out button by the player, the gaming machine dispenses value (step 328) to the player and clears the credit meter accordingly. The value may be dispensed as coins, paper currency, a credit on a card, or a voucher indicating credit, depending on operation of the gaming machine 10 and the player's preferences.

Referring to FIG. 8, if the player has won a winning outcome, the controller 200 increments a number (step 310) on the counter display 421 The player then has the option of returning to base game play or redeeming the winning outcome (or a previously accrued winning outcome) via selection of the bonus game button 419. If the controller 200 detects selection of the bonus game button 419 (step 312) and the controller 200 verifies that a winning outcome has been previously accrued (step 313), and the controller 200 causes the reels to spin and then stop to display a winning symbol combination (step 314*a*) to the player. The counter display 421 is also decremented (step 314*b*) indicating that the player has redeemed one winning outcome.

As previously mentioned, a principle feature of the gaming machine 10 having the player time-selectable bonus award scheme is that redemption of a winning outcome by a player always yields a win for the player. Thus, the controller 200 credits (step 316) the player's value input based on an award or value payout associated with the displayed winning symbol combination. Further, in addition to crediting the player's value input, redemption of a winning outcome may also result in accrual of yet another winning outcome. In that case, the counter display 421 is not decremented and instead reflects the number of winning outcomes prior to redemption of the winning outcome.

If the controller 200 does not detect selection of the bonus game button 419 by the player, the controller 200 enables additional base game play. If additional game play is not desired, the controller 200 detects selection (step 326) of the cash-out option and dispenses remaining value to the player (step 328) accordingly.

For example, referring again to FIG. 8, upon completion of a reel spin, the credit meter 405 displays 696 available credits for additional game play, the win meter 406 displays no credits indicating that the player did not get a winning symbol combination, and the counter display 421 on the bonus game button displays seven accrued winning outcomes.

Figure 9:
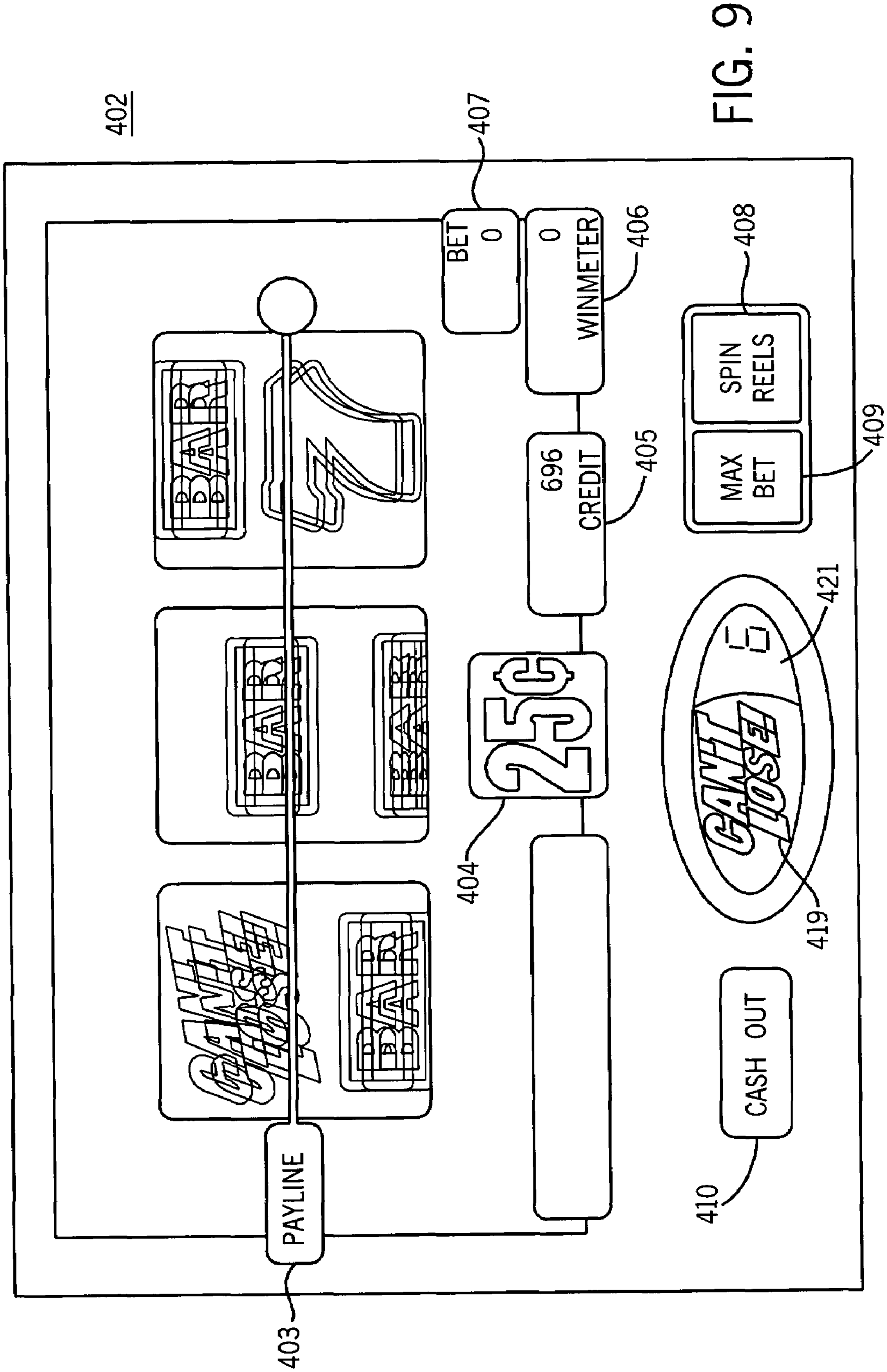
Figure 10:
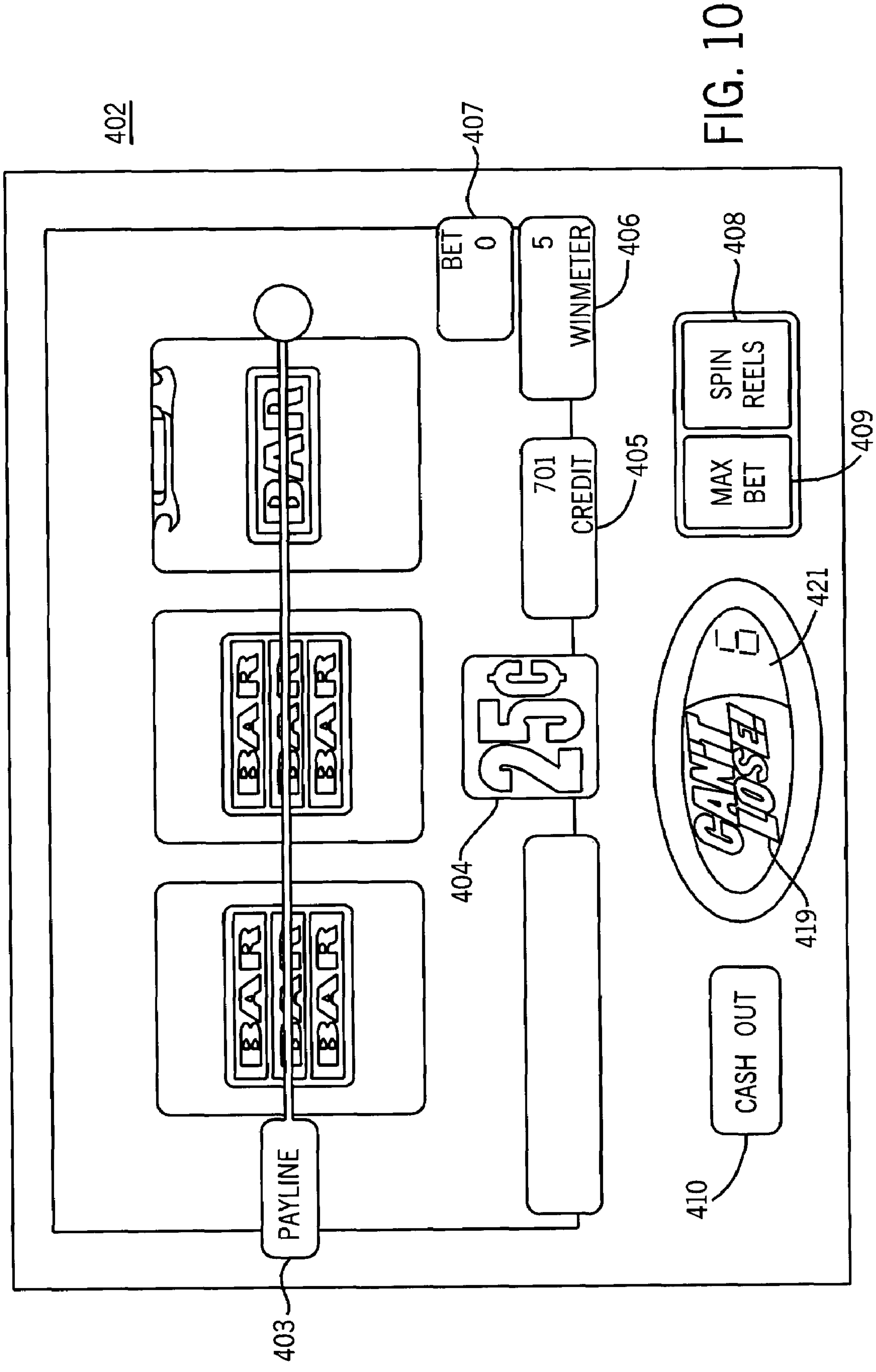

As mentioned above, the player may choose to redeem accumulated winning outcomes at any time during base game play. If the player chooses to redeem a winning outcome, the player selects the bonus game button 419. Upon selection of the bonus game button 419 (step 312), the controller 200 causes the reels to spin (FIG. 9) and then stop (FIG. 10) to display a winning symbol combination (e.g., 2 triple bars and 1 single bar) to the player (step 314*a*). In addition, the controller 200 cause the counter display 421 to decrement by one (step 314*b*), yielding six remaining winning outcomes.

Figure 11:
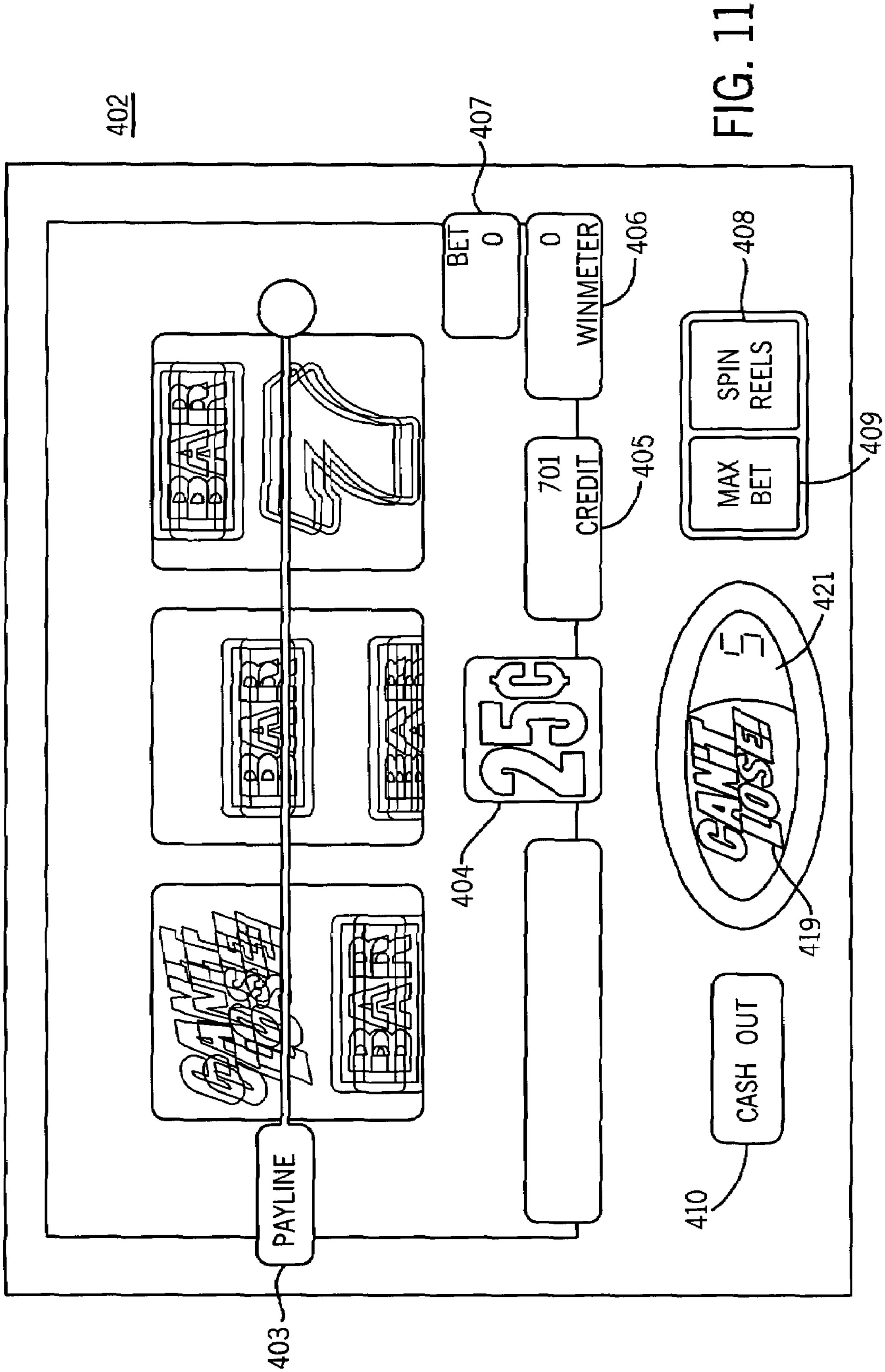
Figure 12:
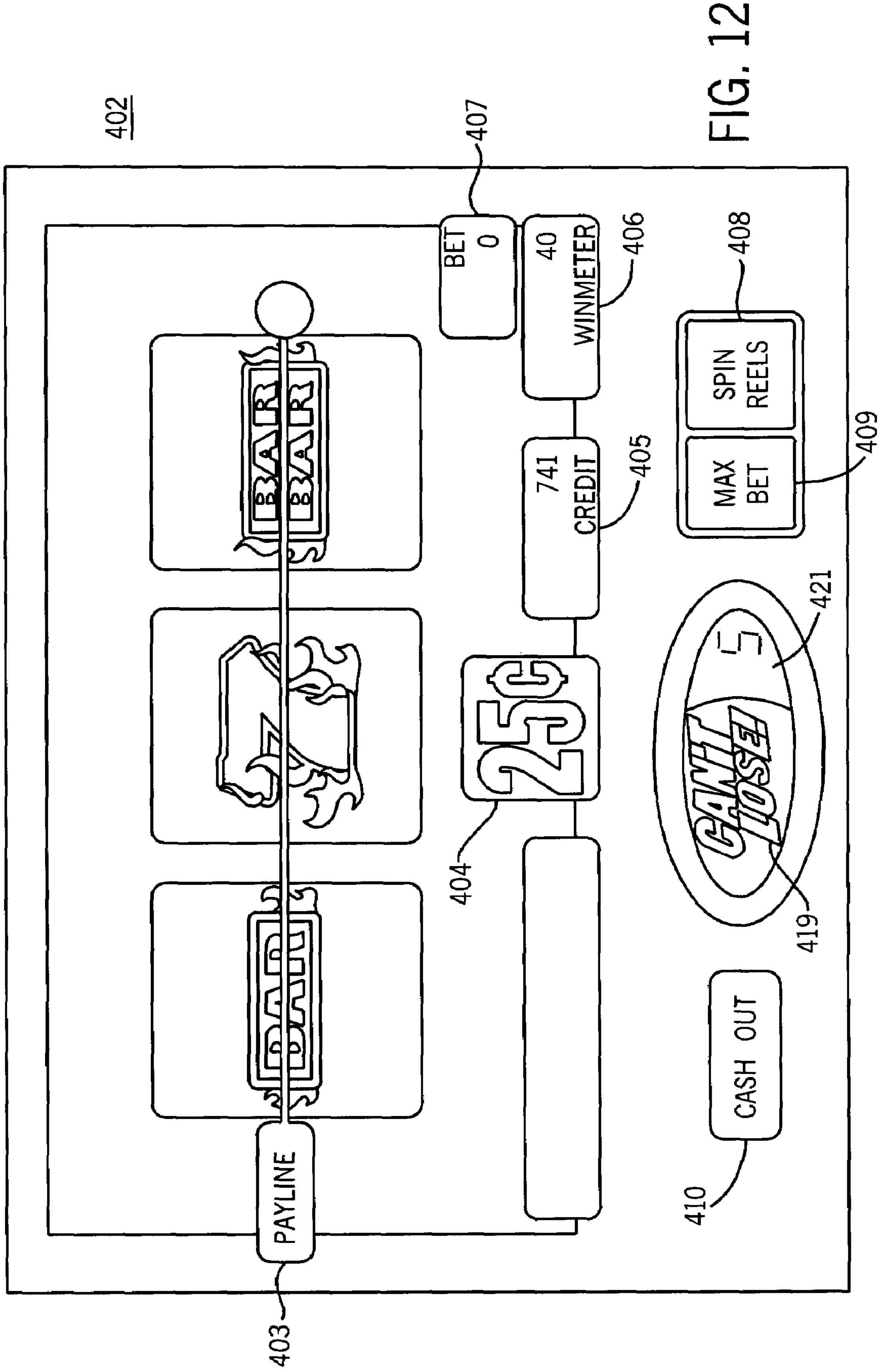

As a result of the winning symbol combination, the number of available credits is increases by five from 696 to 701 credits. Continuing with the example, if the player redeems another winning outcome, the controller 200 causes the reels to spin (FIG. 11) and then stop (FIG. 12) to display another winning symbol combination (e.g., 1 single bar with fire, 7 with fire and a double bar with fire) to the player (step 314*a*). In addition, the controller 200 causes the counter display 421 to decrement by one (step 314*b*), yielding five remaining winning outcomes.

Figure 13:
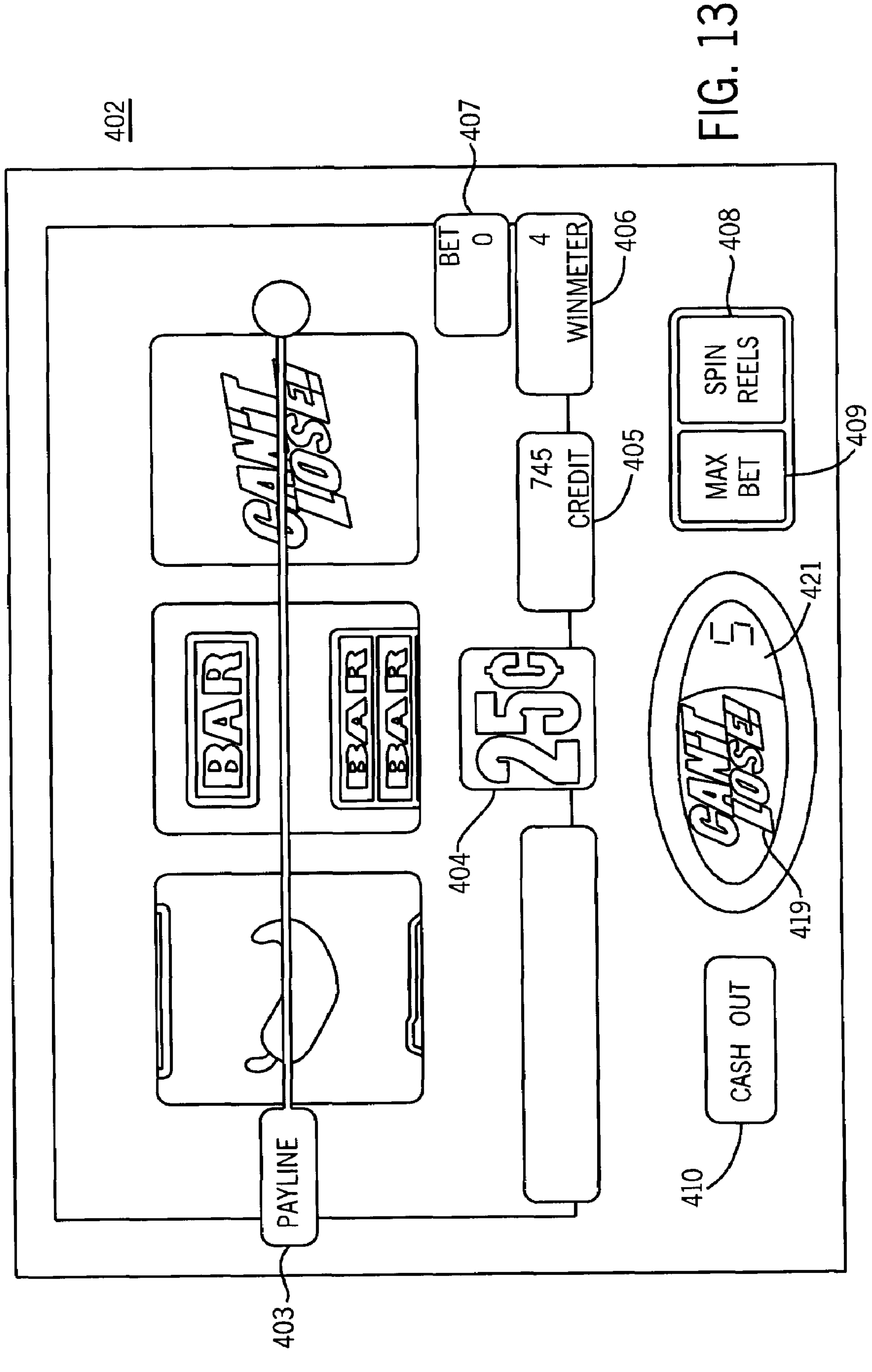

As a result of the winning symbol combination, the number of available credits is increased by 40 from 701 to 741 credits. If the player redeems yet another winning outcome, the controller 200 causes the reels to spin and then stop (FIG. 13) to display yet another winning symbol combination plus a winning outcome (e.g., 1 chili pepper with a guaranteed win, and an additional winning outcome shown as Can't Lose) to the player (step 314*a*). The controller 200 does not cause the counter display 421 to decrement by one because the spin resulted in the addition of another winning outcome. Thus after the spin, five winning outcomes still remain.

As a result of the winning symbol combination (e.g., the chili pepper with a guaranteed win), the number of available credits is increases by four from 741 to 745 credits. If the player chooses to return to base game play, the controller 200 detects a wager (step 302) and play continues as described above. Alternatively, if the player chooses to cash-out, the controller 200 detects activation of the collect button (step 326) and dispenses value (step 328) in an amount equivalent to seven hundred and forty-five credits.

In another embodiment of the invention, the gaming machine having a player time-selectable bonus award scheme is configured with multiplier bonus button (e.g., Mega-multiplier button) having a counter display or meter that increments a multiplier number each time a winning outcome is accrued and decrements to zero each time the player selects the multiplier bonus button to redeem all accrued winning outcome(s) at one time. The counter display increments by a predetermined multiplier number that can vary depending on the game implementation. Each time a winning outcome is accrued, an associated multiplier number is added to previous multiplier numbers on the counter display to form a total multiplier number. When redeemed, an award associated with one revealed winning symbol combination is multiplied by the total multiplier number reflected on the counter display, and the resulting multiplied award, or "mega-award", is credited to the player. Thus, all winning outcomes previously accrued are redeemed at one time, resulting in one winning symbol combination yielding a mega-award, and the counter display resets to zero.

For example, a mechanical spinning reel slot machine having a player time-selectable bonus award scheme may be configured with three reels with each reel displaying one Mega-multiplier Can't Lose symbol among other reel symbols. Each of the Mega-multiplier Can't Lose symbols has a different predetermined multiplier number although it is contemplated that the Mega-multiplier Can't Lose symbols on each of the reels can have the same multiplier number. The first Mega-multiplier Can't Lose symbol has a multiplier number of 3×, the second has a multiplier number of 4×, and the third has a multiplier number of 10×. During game play, one spin results in accrual of a 3× winning outcome and another spin results in accrual of a 10× winning outcome. A counter display of the mechanical spinning reel slot machine therefore reflects a 13× winning outcome. At a time of the player's choosing, the player selects a Mega-multiplier Can't Lose button on the mechanical spinning reel slot machine and the mechanical spinning reels spin until a winning symbol combination is displayed. A mega-award equivalent to 13 times the award associated with the winning symbol combination is credited to the player and the counter display is decremented to zero.

In yet another embodiment of the invention, the gaming machine having a player time-selectable bonus award scheme is configured with (1) a counter display that increments a number each time a winning outcome is accrued and decrements the number each time a player chooses to redeem the accrued winning outcome, (2) a bonus button (e.g., a Can't Lose button) that enables the player to redeem one winning outcome at a time, and (3) a multiplier bonus button (e.g., a Mega-multiplier button) that enables the player to redeem all winning outcomes at one time via displaying one winning symbol combination with an award that is multiplied by a number equivalent to all of the accrued winning outcomes. If the player selects the first button to redeem one winning outcome, the counter display is decremented by one number. If the player selects the second button to redeem all winning outcomes at one time, the counter display is reset to zero (unless redemption results in another winning outcome). In addition, an award associated with one revealed winning symbol combination is multiplied by the total multiplier number reflected on the counter display, and the resulting multiplied award, or "mega-award", is credited to the player In a further embodiment of the invention, the gaming machine having a player time-selectable bonus award scheme is configured with (1) a counter display that increments by a number each time a winning outcome is accrued and decrements by a number equivalent to a number of winning outcomes the player chooses to redeem at one time, (2) a variable bonus button (e.g., Variable Can't Lose button) that enables the player to redeem one or more winning outcomes at one time via displaying one winning symbol combination with an associated award that is multiplied by a number equivalent to the number of winning outcomes that the player redeems at the one time. Thus, when the player selects the variable bonus button to redeem two winning outcomes at one time, the counter display decrements by two, and the award associated with the resulting winning symbol combination is multiplied by two.

For example, a video slot machine having a player time-selectable bonus award scheme may be configured a counter display and a Variable Can't Lose™ button. During game play, one spin may result in accrual of one winning outcome; the counter display increments one. Another spin may result in a 3× winning outcome; the counter display incrementing three to yield a total of four accrued winning outcomes. Yet another spin may result in accrual of a 10× winning outcome. The counter display of the mechanical spinning reel slot machine therefore reflects a total of a 14 winning outcomes. At a time of the players choosing, the player selects the Variable Can't Lose button to redeem one winning outcome. An award associated with the resulting winning symbol combination is credited to the player and the counter display reflects a total of 13 winning outcomes. Next, the player elects to redeem four winning outcomes at one time via selecting the Variable Can't Lose button. An award equivalent to four times the award associated with the resulting winning symbol combination is credited to the player and the counter display decrements to reflect a total of nine winning outcomes.

As may be apparent from the discussion above, the present invention providing a player time-selectable bonus award scheme enhances game play by providing the player with an opportunity to accumulate, and redeem, at a time of the player's choosing, winning outcomes yielding winning symbol combinations having guaranteed awards. Redemption of each of the accrued winning outcomes is accomplished when a player selects an option to display a winning symbol combination associated with the winning outcome. Selection of the option to display the winning symbol combination associated with the winning outcome always yields an award and sometimes yields another winning outcome symbol, redeemable at a time of the player's choosing. A counter display on the gaming machine increments a number as each winning outcome is accrued, and decrements the number as each winning outcome is redeemed.

From the foregoing, it will be observed that numerous variations and modifications may be affected without departing from the scope of the novel concept of the invention. It is to be understood that no limitations with respect to the specific methods and apparatus illustrated herein is intended or should be inferred. It is, of course, intended to cover by the appended claims all such modifications as fall within the scope of the claims.

The invention claimed is:

1. A method of conducting a wagering game comprising:

in response to receiving a wager to play a current play of the wagering game, randomly selecting a current game outcome from a plurality of game outcomes;

displaying at least a portion of the current game outcome;

in response to the current game outcome meeting a predetermined criterion, accruing but not displaying a winning outcome associated with the current game outcome;

after the current play is concluded and the player of the wagering game is allowed to place another wager to play another play subsequent to the current play, providing an option to a player of the wagering game to redeem the accrued winning outcome at a time of the player's choice;

in response to the option being exercised by the player, displaying a winning symbol combination of the winning outcome to the player; and awarding a value payout associated with the winning symbol combination.

2. The method of conducting the wagering game of claim 1, wherein the wagering game is selected from the group consisting of mechanical slots, video slots, video poker, video blackjack, video keno and video bingo.

3. The method of conducting the wagering game of claim 1, wherein the predetermined criterion includes an occurrence of a pre-selected symbol.

4. The method of conducting the wagering game of claim 1, wherein the predetermined criterion includes an occurrence of a pre-selected symbol combination.

5. The method of conducting the wagering game of claim 1, wherein the predetermined criterion is selected from the group consisting of player data, a promotional event, a predetermined number of wagering games played by the player, a value amount played by the player, a value amount won by the player, a time of day, and a day of the week.

6. The method of conducting the wagering game of claim 1, wherein the predetermined criterion includes a pseudo random generated outcome.

7. The method of conducting the wagering game of claim 1, wherein a probability of occurrence of the winning symbol combination displayed in response to the option being exercised is substantially identical to a probability of occurrence of the winning symbol combination during play of the wagering game when the option is not exercised where all non-winning symbol combinations are excluded.

8. The method of conducting the wagering game of claim 1, wherein the winning symbol combination displayed in response to the option being exercised by the player is selected from among a plurality of winning symbol combinations displayed in a base game pay table.

9. The method of conducting the wagering game of claim 1, wherein the winning symbol combination displayed in response to the option being exercised by the player is selected from among a plurality of winning symbol combinations displayed in a bonus game pay table.

10. The method of conducting the wagering game of claim 1, further including incrementing a number on a counter display viewable by the player in response to accruing the winning outcome.

11. The method of conducting the wagering game of claim 10, further including decrementing the number on the counter display in response to exercising the option to redeem the accrued winning outcome.

12. The method of conducting the wagering game of claim 11, wherein the counter display is embedded within a bonus button, the bonus button enabling the player to exercise the option to redeem the accrued winning outcome.

13. The method of conducting the wagering game of claim 11, wherein the number is a multiplier number, and wherein the counter display decrements to zero in response to exercising the option to redeem the accrued winning outcome, and wherein the value payout associated with the winning symbol combination is multiplied by the multiplier number to yield a multiplied value payout to the player.

14. The method of conducting the wagering game of claim 11, wherein the number is a number greater than one, and wherein the counter display decrements by the number greater than one in response to exercising the option to redeem the accrued winning outcome, and wherein the value payout associated with the winning symbol combination is multiplied by the number greater than one to yield a multiplied value payout to the player.

15. A method of conducting a wagering game, the wagering game including a pay table defining a plurality of value payouts and a corresponding plurality of winning symbol combinations associated with the respective value payouts, the method comprising:

displaying a first symbol array in response to receiving a wager from a player;

accruing a winning outcome if the first symbol array includes a predetermined symbol or combination of symbols;

incrementing a number on a counter display viewable by the player in response to accruing the winning outcome, the number on the counter display indicating the number of winning outcomes that the player has accrued;

providing an option to the player to redeem the accrued winning outcome at a time of the player's choice;

in response to the option being exercised by the player, displaying a winning symbol combination and decrementing the number on the counter display; and awarding a value payout associated with the winning symbol combination.

16. The method of conducting the wagering game of claim 15, wherein displaying the winning symbol combination comprises rotating and stopping a plurality of symbol-bearing reels to place symbols on the symbol-bearing reels in a second array, the second array including the winning symbol combination.

17. The method of conducting the wagering game of claim 15, wherein the winning symbol combination displayed in response to the option being exercised by the player is selected from among the plurality of winning symbol combinations defined by the pay table.

18. The method of conducting the wagering game of claim 15, wherein the counter display is embedded within a bonus button, the bonus button enabling the player to exercise the option to redeem the accrued winning outcome.

19. The method of conducting the wagering game of claim 15, wherein the number is a multiplier number, and wherein the counter display decrements to zero in response to exercising the option to redeem the accrued winning outcome, and wherein the value payout associated with the winning symbol combination displayed to the player is multiplied by the multiplier number to yield a multiplied value payout to the player.

20. The method of conducting the wagering game of claim 15, wherein the number is a number greater than one, and wherein the counter display decrements by the number greater than one in response to exercising the option to redeem the accrued winning outcome, and wherein the value payout associated with the winning symbol combination displayed to the player is multiplied by the number greater than one to yield a multiplied value payout to the player.

21. A gaming machine having a wagering game including a player time-selectable bonus award scheme, the gaming machine comprising:

a value input device;

a display device; and a controller operatively coupled to the value input device and the display device, the controller comprising a processor and a memory coupled to the processor, the controller being programmed to allow a player to make a wager to play a current play of a wagering game using the value input device, in response to a current game outcome of the current play meeting a predetermined criterion, accrue, but not display, a winning outcome associated with the current game outcome, after the current play is concluded and the player of the wagering game is allowed to place another wager to play another play subsequent to the current play, provide an option to the player to redeem the accrued winning outcome at a time of the player's choosing, display a winning symbol combination of the winning outcome in response to the option being exercised by the player, and award a value payout associated with the winning symbol combination.

22. The gaming machine of claim 21, wherein the controller is programmed to increment a number on a counter display in response to accruing the winning outcome.

23. The gaming machine of claim 22, wherein the controller is programmed to decrement the number on the counter display when the option to redeem the accrued winning is exercised by the player.

24. The gaming machine of claim 23, wherein the counter display is embedded within a bonus button, and wherein actuation of the bonus button by the player causes the option to be exercised.

25. The gaming machine of claim 23, wherein the number is a multiplier number, and wherein the counter display decrements to zero in response to the option being exercised by the player, and wherein the value payout associated with the winning symbol combination is multiplied by the multiplier number to yield a multiplied value payout to the player.

26. The gaming machine of claim 21, wherein the predetermined criterion includes an occurrence of a pre-selected symbol.

27. The gaming machine of claim 21, wherein the predetermined criterion is selected from the group consisting of player data, a promotional event, a predetermined number of wagering games played by the player, a value amount played by the player, a value amount won by the player, a time of day, and a day of the week.

28. The gaming machine of claim 21, wherein the predetermined criterion includes a pseudo random generated outcome.

29. The gaming machine of claim 21, wherein the display device comprises a plurality of symbol-bearing reels, and wherein the controller is programmed to cause the plurality of symbol-bearing reels to rotate and stop to place symbols on the symbol-bearing reels in a symbol array.

30. The gaming machine of claim 21, wherein the controller is programmed to cause a video image to be generated on the display device, and wherein the video image comprises a plurality of symbols selected from the group consisting of video poker symbols, video blackjack symbols, video slot symbols, video keno symbols and video bingo symbols.

* * * * *